United States Patent
Farmer et al.

(10) Patent No.: US 6,650,991 B2
(45) Date of Patent: Nov. 18, 2003

(54) CLOSED-LOOP METHOD AND SYSTEM FOR PURGING A VEHICLE EMISSION CONTROL

(75) Inventors: David George Farmer, Plymouth, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 371 days.

(21) Appl. No.: 09/884,764

(22) Filed: Jun. 19, 2001

(65) Prior Publication Data

US 2002/0193934 A1 Dec. 19, 2002

(51) Int. Cl.⁷ .............................. F02M 37/04; F01N 3/00
(52) U.S. Cl. ..................... 701/104; 701/109; 701/108; 60/276
(58) Field of Search ................................ 701/104, 103, 701/105, 102, 108, 109; 60/274, 276, 285, 295, 301

(56) References Cited

U.S. PATENT DOCUMENTS

| | | |
|---|---|---|
| 3,696,618 A | 10/1972 | Boyd et al. |
| 3,969,932 A | 7/1976 | Rieger et al. |
| 4,033,122 A | 7/1977 | Masaki et al. |
| 4,036,014 A | 7/1977 | Ariga |
| 4,167,924 A | 9/1979 | Carlson et al. |
| 4,178,883 A | 12/1979 | Herth |
| 4,186,296 A | 1/1980 | Crump, Jr. |
| 4,251,989 A | 2/1981 | Norimatsu et al. |
| 4,533,900 A | 8/1985 | Muhlberger et al. |
| 4,622,809 A | 11/1986 | Abthoff et al. |
| 4,677,955 A | 7/1987 | Takao |
| 4,854,123 A | 8/1989 | Inoue et al. |
| 4,884,066 A | 11/1989 | Miyata et al. |
| 4,913,122 A | 4/1990 | Uchida et al. |
| 4,964,272 A | 10/1990 | Kayanuma |
| 5,009,210 A | 4/1991 | Nakagawa et al. |
| 5,088,281 A | 2/1992 | Izutani et al. |

(List continued on next page.)

FOREIGN PATENT DOCUMENTS

| | | |
|---|---|---|
| DE | 196 07 151 C1 | 7/1997 |
| EP | 0 351 197 A2 | 1/1990 |

(List continued on next page.)

OTHER PUBLICATIONS

C. D. De Boer et al., "Engineered Control Strategies for Improved Catalytic Control of $NO_x$ in Lean Burn Applications," SAE Technical Paper No. 881595, Oct. 10–13, 1988.

Y. Kaneko et al., "Effect of Air–Fuel Ratio Modulation on Conversion Efficiency of Three–Way Catalysts," SAE Technical Paper No. 780607, Jun. 5–9, 1978, pp. 119–127.

(List continued on next page.)

Primary Examiner—Hieu T. Vo
(74) Attorney, Agent, or Firm—Julia Voutyras; Allan J. Lippa

(57) ABSTRACT

A vehicle exhaust treatment system includes an emission control device featuring at least one upstream $NO_x$-storing "brick," and a downstream $NO_x$-storing "brick" that is substantially smaller in nominal capacity than the upstream brick. An oxygen sensor positioned between the upstream and downstream bricks generates an output signal representing the concentration of oxygen in the device. A controller selects a rich operating condition to purge the device of stored $NO_x$, and deselects the rich, $NO_x$-purging engine operating condition in response to the sensor output signal, preferably after an additional time delay calculated to provide sufficient excess hydrocarbons to release substantially all stored $NO_x$ from the downstream brick.

21 Claims, 1 Drawing Sheet

U.S. PATENT DOCUMENTS

| | | |
|---|---|---|
| 5,097,700 A | 3/1992 | Nakane |
| 5,165,230 A | 11/1992 | Kayanuma et al. |
| 5,174,111 A | 12/1992 | Nomura et al. |
| 5,189,876 A | 3/1993 | Hirota et al. |
| 5,201,802 A | 4/1993 | Hirota et al. |
| 5,209,061 A | 5/1993 | Takeshima |
| 5,222,471 A | 6/1993 | Stueven |
| 5,233,830 A | 8/1993 | Takeshima et al. |
| 5,267,439 A | 12/1993 | Raff et al. |
| 5,270,024 A | 12/1993 | Kasahara et al. |
| 5,272,871 A | 12/1993 | Oshima et al. |
| 5,325,664 A | 7/1994 | Seki et al. |
| 5,331,809 A | 7/1994 | Takeshima et al. |
| 5,335,538 A | 8/1994 | Blischke et al. |
| 5,357,750 A | 10/1994 | Ito et al. |
| 5,359,852 A | 11/1994 | Curran et al. |
| 5,377,484 A | 1/1995 | Shimizu |
| 5,379,591 A * | 1/1995 | Iwata et al. .................. 60/276 |
| 5,402,641 A | 4/1995 | Katoh et al. |
| 5,410,873 A | 5/1995 | Tashiro |
| 5,412,945 A | 5/1995 | Katoh et al. |
| 5,412,946 A | 5/1995 | Oshima et al. |
| 5,414,994 A | 5/1995 | Cullen et al. |
| 5,419,122 A | 5/1995 | Tabe et al. |
| 5,423,181 A | 6/1995 | Katoh et al. |
| 5,426,934 A | 6/1995 | Hunt et al. |
| 5,433,074 A | 7/1995 | Seto et al. |
| 5,437,153 A | 8/1995 | Takeshima et al. |
| 5,448,886 A | 9/1995 | Toyoda |
| 5,448,887 A | 9/1995 | Takeshima |
| 5,450,722 A | 9/1995 | Takeshima et al. |
| 5,452,576 A | 9/1995 | Hamburg et al. |
| 5,472,673 A | 12/1995 | Goto et al. |
| 5,473,887 A | 12/1995 | Takeshima et al. |
| 5,473,890 A | 12/1995 | Takeshima et al. |
| 5,483,795 A | 1/1996 | Katoh et al. |
| 5,531,972 A | 7/1996 | Rudy |
| 5,544,482 A | 8/1996 | Matsumoto et al. |
| 5,551,231 A | 9/1996 | Tanaka et al. |
| 5,554,269 A | 9/1996 | Joseph et al. |
| 5,569,848 A | 10/1996 | Sharp |
| 5,570,674 A * | 11/1996 | Izumiura et al. ............. 123/520 |
| 5,577,382 A | 11/1996 | Kihara et al. |
| 5,595,060 A | 1/1997 | Togai et al. |
| 5,598,703 A | 2/1997 | Hamburg et al. |
| 5,610,844 A | 3/1997 | Maus et al. .................... 60/274 |
| 5,617,722 A | 4/1997 | Takaku |
| 5,622,047 A | 4/1997 | Yamashita et al. |
| 5,626,014 A | 5/1997 | Hepburn et al. |
| 5,626,117 A | 5/1997 | Wright et al. |
| 5,655,363 A | 8/1997 | Ito et al. |
| 5,657,625 A | 8/1997 | Koga et al. |
| 5,693,877 A | 12/1997 | Ohsuga et al. |
| 5,713,199 A | 2/1998 | Takeshima et al. |
| 5,715,679 A | 2/1998 | Asanuma et al. |
| 5,722,236 A | 3/1998 | Cullen et al. |
| 5,724,808 A | 3/1998 | Ito et al. |
| 5,729,971 A | 3/1998 | Matsuno et al. |
| 5,732,554 A | 3/1998 | Sasaki et al. |
| 5,735,119 A | 4/1998 | Asanuma et al. |
| 5,737,917 A | 4/1998 | Nagai |
| 5,740,669 A | 4/1998 | Kinugasa et al. |
| 5,743,084 A | 4/1998 | Hepburn |
| 5,743,086 A | 4/1998 | Nagai |
| 5,746,049 A | 5/1998 | Cullen et al. |
| 5,746,052 A | 5/1998 | Kinugasa et al. |
| 5,752,492 A | 5/1998 | Kato et al. |
| 5,771,685 A | 6/1998 | Hepburn |
| 5,771,686 A | 6/1998 | Pischinger et al. |
| 5,778,666 A | 7/1998 | Cullen et al. |
| 5,792,436 A | 8/1998 | Feeley et al. |
| 5,802,843 A | 9/1998 | Kurihara et al. |
| 5,803,048 A | 9/1998 | Yano et al. |
| 5,806,306 A | 9/1998 | Okamoto et al. |
| 5,813,387 A | 9/1998 | Minowa et al. |
| 5,831,267 A | 11/1998 | Jack et al. |
| 5,832,722 A | 11/1998 | Cullen et al. |
| 5,842,339 A | 12/1998 | Bush et al. |
| 5,842,340 A | 12/1998 | Bush et al. |
| 5,862,661 A | 1/1999 | Zhang et al. |
| 5,865,027 A | 2/1999 | Hanafusa et al. |
| 5,867,983 A | 2/1999 | Otani |
| 5,877,413 A | 3/1999 | Hamburg et al. |
| 5,910,096 A | 6/1999 | Hepburn et al. |
| 5,929,320 A | 7/1999 | Yoo |
| 5,934,072 A | 8/1999 | Hirota et al. |
| 5,938,715 A | 8/1999 | Zhang et al. |
| 5,953,907 A | 9/1999 | Kato et al. |
| 5,966,930 A | 10/1999 | Hatano et al. |
| 5,970,707 A | 10/1999 | Sawada et al. |
| 5,974,788 A | 11/1999 | Hepburn et al. |
| 5,974,791 A | 11/1999 | Hirota et al. |
| 5,974,793 A | 11/1999 | Kinugasa et al. |
| 5,974,794 A | 11/1999 | Gotoh et al. |
| 5,979,161 A | 11/1999 | Hanafusa et al. |
| 5,979,404 A | 11/1999 | Minowa et al. |
| 5,983,627 A | 11/1999 | Asik |
| 5,992,142 A | 11/1999 | Pott |
| 5,996,338 A | 12/1999 | Hirota |
| 6,003,308 A | 12/1999 | Tsutsumi et al. ............. 60/276 |
| 6,012,282 A | 1/2000 | Kato et al. |
| 6,012,428 A | 1/2000 | Yano et al. |
| 6,014,859 A | 1/2000 | Yoshizaki et al. |
| 6,018,944 A | 2/2000 | Davey et al. .................. 60/274 |
| 6,023,929 A | 2/2000 | Ma |
| 6,026,640 A | 2/2000 | Kato et al. |
| 6,055,971 A * | 5/2000 | Beechie et al. ............. 123/680 |
| 6,058,700 A | 5/2000 | Yamashita et al. |
| 6,073,440 A | 6/2000 | Douta et al. |
| 6,079,204 A | 6/2000 | Sun et al. |
| 6,092,021 A | 7/2000 | Ehlbeck et al. |
| 6,092,369 A | 7/2000 | Hosogai et al. |
| 6,101,809 A | 8/2000 | Ishuzuka et al. |
| 6,102,019 A | 8/2000 | Brooks |
| 6,105,365 A | 8/2000 | Deeba et al. |
| 6,119,449 A | 9/2000 | Köhler |
| 6,128,899 A | 10/2000 | Oono et al. |
| 6,134,883 A | 10/2000 | Kato et al. |
| 6,138,453 A | 10/2000 | Sawada et al. |
| 6,145,302 A | 11/2000 | Zhang et al. |
| 6,145,305 A | 11/2000 | Itou et al. |
| 6,148,611 A | 11/2000 | Sato |
| 6,148,612 A | 11/2000 | Yamashita et al. |
| 6,161,378 A | 12/2000 | Hanaoka et al. |
| 6,161,428 A | 12/2000 | Esteghlal et al. |
| 6,164,064 A | 12/2000 | Pott |
| 6,189,523 B1 | 2/2001 | Weisbrod et al. |
| 6,199,373 B1 | 3/2001 | Hepburn et al. |
| 6,202,406 B1 | 3/2001 | Griffin et al. |
| 6,205,773 B1 | 3/2001 | Suzuki |
| 6,214,207 B1 | 4/2001 | Miyata et al. |
| 6,216,448 B1 | 4/2001 | Schnaibel et al. |
| 6,216,451 B1 | 4/2001 | Schnaibel et al. |
| 6,233,923 B1 | 5/2001 | Itou et al. |
| 6,237,330 B1 | 5/2001 | Takahashi et al. |
| 6,244,046 B1 | 6/2001 | Yamashita |
| 6,453,665 B1 * | 9/2002 | Bower et al. .................. 60/285 |
| 6,487,853 B1 * | 12/2002 | Hepburn et al. ............. 60/295 |
| 6,553,754 B2 * | 4/2003 | Meyer et al. ............... 701/103 |
| 6,564,781 B2 * | 5/2003 | Matsumoto et al. ........ 123/520 |

FOREIGN PATENT DOCUMENTS

| | | |
|---|---|---|
| EP | 0 444 783 A1 | 9/1991 |
| EP | 0 503 882 A1 | 9/1992 |
| EP | 0 508 389 A1 | 1/1994 |
| JP | 62-97630 | 5/1987 |
| JP | 62-117620 | 5/1987 |
| JP | 64-53042 | 3/1989 |
| JP | 2-30915 | 2/1990 |
| JP | 2-33408 | 2/1990 |
| JP | 2-207159 | 8/1990 |
| JP | 3-135147 | 6/1991 |
| JP | 5-26080 | 2/1993 |
| JP | 5079922 | 3/1993 |
| JP | 5-106493 | 4/1993 |
| JP | 5-106494 | 4/1993 |
| JP | 6-58139 | 3/1994 |
| JP | 6-264787 | 9/1994 |
| JP | 7-97941 | 4/1995 |
| WO | WO 98/27322 | 6/1998 |

W. H. Holl, "Air–Fuel Control to Reduce Emissions I. Engine–Emissions Relationships," SAE Technical Paper No. 800051, Feb. 25–29, 1980.

A. H. Meitzler, "Application of Exhaust–Gas–Oxygen Sensors to the Study of Storage Effects in Automotive Three–Way Catalysts," SAE Technical Paper No. 800019, Feb. 25–29, 1980.

J. Theis et al., "An Air/Fuel Algorithm to Improve the $NO_x$ Conversion of Copper–Based Catalysts," SAE Technical Paper No. 922251, Oct. 19–22, 1992.

W. Wang, "Air–Fuel Control to Reduce Emissions, II. Engine–Catalyst Characterization Under Cyclic Conditions," SAE Technical Paper No. 800052, Feb. 25–29, 1980.

T. Yamamoto et al., "Dynamic Behavior Analysis of Three Way Catalytic Reaction," JSAE 882072–882166.

* cited by examiner

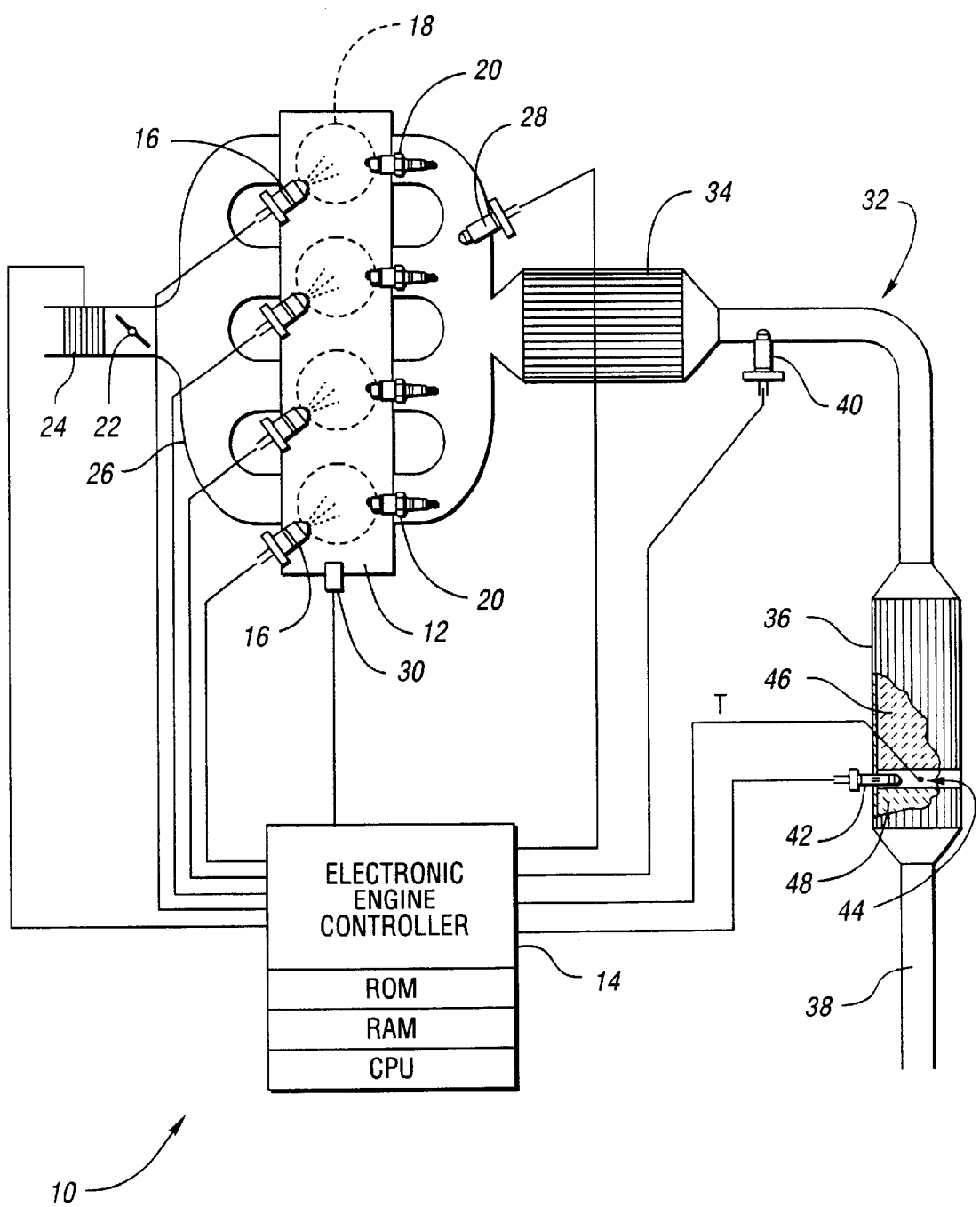

CLOSED-LOOP METHOD AND SYSTEM FOR PURGING A VEHICLE EMISSION CONTROL

BACKGROUND OF THE INVENTION

1. Field of the Invention

The invention relates to methods and systems for treating vehicle exhaust gas to provide reduced vehicle tailpipe emissions.

2. Background Art

The operation of a typical internal combustion engine, as may be found in motor vehicles, results in the generation of engine exhaust which includes a variety of constituents, including carbon monoxide (CO), hydrocarbons (HC), and nitrogen oxides ($NO_x$). The rates at which an engine generates these constituents are dependent upon a variety of factors, such as engine operating speed and load, engine temperature, spark timing, and EGR. Moreover, such engines often generate increased levels of one or more constituents, such as $NO_x$, when the engine is operated in a lean-burn cycle, i.e., when engine operation includes engine operating conditions characterized by a ratio of intake air to injected fuel that is greater than the stoichiometric air-fuel ratio, for example, to achieve greater vehicle fuel economy.

Vehicle exhaust treatment systems often employ a three-way catalyst, referred to as an emission control device, disposed in an exhaust passage to store and release constituents such as $NO_x$ depending upon engine operating conditions. For example, U.S. Pat. No. 5,437,153 teaches an emission control device which stores exhaust gas $NO_x$ when the exhaust gas is lean, and releases previously-stored $NO_x$ when the exhaust gas is either stoichiometric or "rich" of stoichiometric, i.e., when the ratio of intake air to injected fuel is at or below the stoichiometric air-fuel ratio. Such systems often employ open-loop control of device storage and release times (also respectively known as device "fill" and "purge" times) so as to maximize the benefits of increased fuel efficiency obtained through lean engine operation without concomitantly increasing tailpipe emissions as the device becomes "filled." Thus, for example, U.S. Pat. No. 5,437,153 teaches an open-loop method for determining appropriate device fill times wherein an accumulated estimate of instantaneous engine-generated $NO_x$ (all of which is presumed to be stored in the device when operating in a linear operating range) is compared to a reference value representative of the instantaneous maximum $NO_x$-storing capacity of the device, determined as a function of instantaneous device temperature. When the accumulated estimate exceeds the reference value, the "fill" is deemed to be complete, and lean engine operation is immediately discontinued in favor of an open-loop purge whose duration is similarly based on the estimated amount of stored $NO_x$.

Unfortunately, such open-loop, accumulator-based models generally fail to address the fact that the instantaneous storage efficiency of the device is a complex function of many variables, including sulfur poisoning, the temperature of the device, device oxygen storage, component aging, and vehicle driving conditions. Accordingly, the estimate of the amount of a constituent exhaust gas, such as $NO_x$, which has been stored in the device is only an approximation and, hence, any purge time determined on the basis of the estimated stored amount is equally susceptible to error.

The inventors herein have recognized a need for a method and system for purging an emission control device which does not solely rely upon a prior estimate, obtained during a device fill, of the amount of a constituent exhaust gas which must be released from the device during the purge event.

SUMMARY OF THE INVENTION

Under the invention, a method is provided for releasing, from an emission control device receiving exhaust gas generated by an internal combustion engine, an amount of a constituent of the exhaust gas that is stored in the device. The method includes generating, during a first time period, a first flow of exhaust gas through the device that is rich of a stoichiometric air-fuel ratio, for example, by operating the engine at a rich operating condition characterized by a ratio of intake air to injected fuel that is greater than the stoichiometric air-fuel ratio; detecting, as with a suitable sensor, a characteristic of the first flow of exhaust gas at a position within the device between an upstream portion of the device and a downstream portion of the device; and determining the first time period on the basis of the detected characteristic. By way of example, in a preferred embodiment, the sensor is a "switching-type" oxygen sensor whose output signal is representative of a concentration of oxygen in the exhaust gas flowing through the device. Thus, in the preferred embodiment, the rich operating condition is selected; and hence, the rich air-fuel mixture is maintained to purge the device of stored gas, such as stored $NO_x$, until the output signal generated by the oxygen sensor indicates that the oxygen concentration at the sensor's position within the device has fallen below a predetermined reference value, thereby evidencing a "breaking through" of available hydrocarbons to the sensor's relative position within the device. At this point, the upstream portion of the device is nearly completely purged of stored $NO_x$, while the relatively smaller portion of the device downstream of the oxygen sensor still stores a quantity of $NO_x$.

In order to substantially purge stored gas from the downstream portion of the device, the method preferably also includes calculating a first amount of fuel, in excess of the stoichiometric amount, necessary to purge substantially all of the stored gas remaining in the downstream portion of the device. Because a certain amount of rich exhaust gas has already been introduced into the exhaust system upstream of the device at the time the mid-device oxygen sensor output signal falls below the predetermined reference value, with the concentration of excess hydrocarbons in the introduced exhaust gas being a function of engine speed, load and air-fuel ratio during the period immediately preceding the "switching" of the sensor output, the method preferably also includes calculating a second amount of excess fuel that has already been introduced into the exhaust system upstream of the device.

The method further preferably includes subtracting the second excess fuel amount from the first excess fuel amount to obtain an additional excess fuel amount, and determining an additional time period, when operating with the rich air-fuel ratio at a current engine speed and load, necessary to supply the additional excess fuel amount for use in purging the downstream portion of the device. The rich operating condition is thus continued for a predetermined time period after the sensor output signal falls below the reference value, with the predetermined time period being no greater than the determined additional time period necessary to supply the additional excess fuel amount.

Thus, the invention advantageously only requires estimation of the amount of excess fuel required to purge the relatively small downstream portion of the device, and the concentration of excess hydrocarbons present in the exhaust gas during the rich operating condition. And, through careful adjustment of the size of the downstream brick, the amount of additional excess fuel necessary to substantially purge, or to otherwise release a desired amount of stored gas from, the downstream brick is preferably closely matched with the amount of excess fuel which has already been introduced into the exhaust system upstream of the device at the time the mid-device oxygen sensor switches, whereupon the additional time period can be reduced to a very small, preferably near-zero value for a nominal rich (purging) air-fuel mixture, and at a nominal engine speed and load. Thus optimized, any error in the resulting determination of the additional time period required during any given purge event to purge the downstream portion of the device is not likely to substantially impact the benefits conferred by the invention, which otherwise include an overall reduction in HC, CO and $NO_x$ emissions, and a significant improvement in vehicle fuel economy.

The above object and other objects, features and advantages of the present invention are readily apparent from the following detailed description of the best mode for carrying out the invention when taken in connection with the accompanying drawings.

BRIEF DESCRIPTION OF THE DRAWINGS

The Drawing is a schematic of an exemplary system for practicing the invention.

DETAILED DESCRIPTION OF THE PREFERRED EMBODIMENT(S)

Referring to the Drawing, an exemplary control system 10 for a four-cylinder, direct-injection, spark-ignition, gasoline-powered engine 12 for a motor vehicle includes an electronic engine controller 14 having ROM, RAM and a processor ("CPU") as indicated. The controller 14 controls the operation of a set of fuel injectors 16. The fuel injectors 16, which are of conventional design, are each positioned to inject fuel into a respective cylinder 18 of the engine 12 in precise quantities as determined by the controller 14. The controller 14 similarly controls the individual operation, i.e., timing, of the current directed through each of a set of spark plugs 20 in a known manner.

The controller 14 also controls an electronic throttle 22 that regulates the mass flow of air into the engine 12. An air mass flow sensor 24, positioned at the air intake of engine's intake manifold 26, provides a signal regarding the air mass flow resulting from positioning of the engine's throttle 22. The air flow signal from the air mass flow sensor 24 is utilized by the controller 14 to calculate an air mass value which is indicative of a mass of air flowing per unit time into the engine's induction system.

A first oxygen sensor 28 coupled to the engine's exhaust manifold detects the oxygen content of the exhaust gas generated by the engine 12 and transmits a representative output signal to the controller 14. The first oxygen sensor 28 provides feedback to the controller 14 for improved control of the air-fuel ratio of the air-fuel mixture supplied to the engine 12, particularly during operation of the engine 12 at or near the stoichiometric air-fuel ratio which, for a constructed embodiment, is about 14.65. A plurality of other sensors, including an engine speed sensor and an engine load sensor, indicated generally at 30, also generate additional signals in a known manner for use by the controller 14.

An exhaust system 32 transports exhaust gas produced from combustion of an air-fuel mixture in each cylinder 18 through a pair of catalytic emission control devices 34,36, both of which function in a known manner to reduce the amount of engine-generated exhaust gas constituents, including $NO_x$, exiting the vehicle tailpipe 38. A second oxygen sensor 40, which may also be a switching-type HEGO sensor, is positioned in the exhaust system 32 between the three-way catalyst 34 and the device 36.

In accordance with the invention, a third oxygen sensor 42 is positioned within a gap 44 defined within the second device 36 in between two device media "bricks" 46,48. Significantly, the downstream brick 48 preferably forms a relatively small portion of the total media within the second device 36. For example, in a constructed embodiment, the downstream brick 48 preferably forms no greater than perhaps one-third of the $NO_x$-storing media within the second device 36. Further, in accordance with another feature of the invention, the upstream brick 46 may preferably be formed of a different $NO_x$-storing material than the downstream brick 48, in recognition of the fact that the upstream brick 46 is likely to encounter slightly higher exhaust gas temperatures than the downstream brick 48.

In operation, upon the scheduling of a purge event, the controller 14 adjusts the output of the fuel injectors 16 to achieve a rich (purge) air-fuel ratio. During each subsequent background loop, the controller 14 compares the exhaust gas oxygen concentration with a predetermined reference value. If the controller 14 determines that the mid-device exhaust gas oxygen concentration has fallen below the predetermined reference value, the controller 14 updates a stored value ADTL_PRG_TMR representing an amount of time, after the mid-device sensor 42 has "switched," that the rich operating condition has been continued. In the meantime, the controller 14 has also determined a value ADTL_PRG_TIM representing the additional time period, after the mid-device sensor 42 has "switched," during which the rich operating condition must be continued in order to purge stored $NO_x$ from the second device's downstream brick 48.

More specifically, in a preferred embodiment, when determining the additional time value ADTL_PRG_TIM, the controller 14 calculates an amount XSF_NEC of fuel, in excess of the stoichiometric amount, necessary to purge substantially all of the remaining $NO_x$ from the downstream brick 48 (the amount of remaining $NO_x$, for example, having itself been estimated in a known manner during the prior fill event). The controller 14 also calculates, as a function of the rich air-fuel ratio and suitable values for engine speed and load covering the time period immediately preceding the "switching" of the sensor output, an amount XSF_INTRO of excess fuel that has already been introduced into the exhaust system 10 upstream of the second device 36.

The controller 14 then subtracts the introduced excess fuel amount XSF_INTRO from the necessary excess fuel amount XSF_NEC to obtain an additional excess fuel amount XSF_ADTL. Because continued engine operation at the rich operating condition provides a concentration of excess hydrocarbons as a function of the rich air-fuel ratio, and current engine speed and load, the additional time period ADTL_PRG_TIM during which to extend the rich operating condition after the mid-device sensor 42 "switches" is equal to the additional excess fuel amount XSF_ADTL divided by a calculated value representing the current concentration of excess hydrocarbons in the exhaust gas flowing through the second device 36.

The controller 14 then compares the updated value ADTL_PRG_TMR with the determined additional time period ADTL ERG TIM. If the controller 14 determines that the updated value ADTL_PRG_TMR is less than the determined additional time period ADTL_PRG_TIM, the control process loops back to continue the rich operating condition to purge additional stored $NO_x$ from the second device's downstream brick 48. In this manner, the rich operating condition is continued for the determined additional time period ADTL_PRG_TIM after the mid-device sensor output signal falls below the reference value. If the controller 14 determines that the updated value ADTL_PRG_TMR is equal to or greater than the determined additional time period ADTL_PRG_TIM, the controller 14 deselects the rich operating condition in favor of a normal operating condition, characterized by combustion of either a stoichiometric air-fuel mixture or, most preferably, a lean air-fuel mixture.

From the foregoing, it will be appreciated that the upstream and downstream bricks 46,48 are preferably sized such that the amount of fuel, in excess of the stoichiometric amount, present in the exhaust system upstream of the second device 36 when the mid-device sensor 42 "switches" will be sufficient to purge nearly all of the $NO_x$ stored in the downstream brick 48. In this manner, the determined additional time period ADTL_PRG_TIM will be reduced to a near-zero value, thereby simplifying the control process for the exemplary system 10. Moreover, such a reduction in the determined additional time period ADTL_PRG_TIM will advantageously reduce any error introduced when estimating the amount of $NO_x$ previously stored in the downstream brick 48, thereby further improving the timing accuracy of the resulting purge event.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, while the exemplary exhaust gas treatment system described above includes a pair of switching HEGO sensors 28,38, the invention contemplates use of other suitable sensors for generating a signal representative of the oxygen concentration in the exhaust manifold and exiting the first device 32, respectively, including but not limited to exhaust gas oxygen (EGO) type sensors, and linear-type sensors such as universal exhaust gas oxygen (UEGO) sensors.

What is claimed:

1. A system for controlling the operation of an internal combustion engine, wherein the engine operates at a plurality of operating conditions characterized by combustion of a range of air-fuel mixtures to generate exhaust gas, the exhaust gas flowing through an emission control device for storing a constituent of the exhaust gas when the exhaust gas is lean of a stoichiometric air-fuel mixture and of releasing the stored constituent when the exhaust gas is rich of a stoichiometric air-fuel mixture, the system comprising:
    a controller including a microprocessor arranged to select a first operating condition, characterized by combustion of a first air-fuel mixture lean of a stoichiometric air-fuel ratio, for a first time period sufficient to store a significant amount of the constituent in both an upstream portion of the device material and a downstream portion of the device material, and to select a second operating condition, characterized by combustion of a second air-fuel mixture rich of the stoichiometric air-fuel ratio, and wherein the controller is further arranged to deselect the second operating condition based upon a detected characteristic of the exhaust gas flowing through the device at a first position between an upstream portion of the device and a downstream portion of the device.

2. The system of claim 1, wherein the detected characteristic is an oxygen concentration, and wherein the controller is further arranged to determine when the detected oxygen concentration falls below a predetermined reference value.

3. The system of claim 2, wherein the controller is further arranged to calculate an additional amount of fuel, in excess of a stoichiometric amount, necessary to purge only an amount of $NO_x$ stored in the downstream portion of the device material, to determine an additional time period necessary to supply the additional amount of fuel, in excess of the stoichiometric amount, when operating the engine with the second air-fuel mixture, and to delay deselecting the second operating condition for a second time period after the detected oxygen concentration falls below the reference value, the second time period being no greater than the determined additional time period.

4. The system of claim 3, wherein the constituent is $NO_x$, and wherein the controller is further arranged to estimate the amount of $NO_x$ stored in the downstream portion of the device during the first operating condition.

5. A method for controlling the operation of an internal combustion engine, wherein the engine operates at a plurality of operating conditions characterized by combustion of a range of air-fuel mixtures to generate exhaust gas, the exhaust gas flowing through an emission control device for storing a constituent of the exhaust gas when the exhaust gas is lean of a stoichiometric air-fuel mixture and for releasing the stored constituent when the exhaust gas is rich of a stoichiometric air-fuel mixture, the method comprising:
    selecting a first operating condition, characterized by combustion of a first air-fuel mixture lean of a stoichiometric air-fuel ratio, for a first time period sufficient to store a significant amount of the constituent in both an upstream portion of the device and a downstream portion of the device;
    selecting a second operating condition, characterized by combustion of a second air-fuel mixture rich of the stoichiometric air-fuel ratio;
    detecting, during the second operating condition, a concentration of oxygen in the exhaust gas flowing through the device at a first position within the device located between the upstream portion of the device and a downstream portion of the device; and
    deselecting the second operating condition based upon a comparison of the detected concentration to a reference value.

6. The method of claim 5, further including:
    calculating an additional amount of fuel, in excess of a stoichiometric amount, necessary to purge only an amount of $NO_x$ stored in the downstream portion of the device material; and
    determining an additional time period necessary to supply the additional amount of fuel, in excess of the stoichiometric amount, when operating the engine with the second air-fuel mixture,
    and wherein deselecting occurs a second time period after the detected concentration falls below the reference value, the second time period being no greater than the determined additional time period.

7. The method of claim 6, wherein calculating includes determining an amount of fuel that has been introduced into the exhaust system upstream of the device when the detected concentration falls below a reference value.

8. The method of claim 6, including estimating the amount of $NO_x$ stored in the downstream portion of the device during the first operating condition.

9. The method of claim 5, wherein detecting includes generating an output signal with an oxygen sensor located at the first position in the device.

10. A method for releasing, from an emission control device receiving exhaust gas generated by an internal combustion engine, an amount of a constituent of the exhaust gas that is stored in the device, the method comprising:

generating, during a first time period, a first flow of exhaust gas through the device that is rich of a stoichiometric air-fuel ratio; and detecting a characteristic of the first flow of exhaust gas at a position within the device between an upstream portion of the device and a downstream portion of the device; and determining the first time period on the basis of the detected characteristic.

11. The method of claim 10, wherein generating includes operating the engine at a rich operating condition characterized by a ratio of intake air to injected fuel that is greater than the stoichiometric air-fuel ratio.

12. The method of claim 11, including:

calculating an amount of fuel, in excess of the stoichiometric amount, necessary to purge a predetermined amount of stored constituent in the downstream portion of the device; and determining an additional time period necessary to supply the additional amount of fuel, in excess of the stoichiometric amount, when generating the first flow of exhaust gas, wherein the first time period is further determined on the basis of the additional time period.

13. The method of claim 12, wherein the first time period includes a second time period after the detected characteristic falls below a reference value, the second time period being no greater than the determined additional time period.

14. The method of claim 12, wherein calculating includes determining an amount of fuel that has been introduced into the exhaust system upstream of the device when the detected characteristic falls below a reference value.

15. The method of claim 10, wherein the detected characteristic is representative of a concentration of oxygen in the first flow of exhaust gas.

16. A method for purging, from an emission control device receiving exhaust gas generated by an internal combustion engine that includes $NO_x$, an amount of $NO_x$ stored in the device, wherein the device includes an upstream portion and a downstream portion, the method comprising:

operating the engine with an air-fuel mixture rich of a stoichiometric air-fuel mixture for a first time period; and simultaneously detecting, at a first position within the device located between the upstream portion and the downstream portion, a concentration of oxygen in the exhaust gas, wherein the first time period is determined on the basis of the detected concentration.

17. The method of claim 16, including:

calculating an additional amount of fuel, in excess of a stoichiometric amount, necessary to purge only the amount of $NO_x$ stored in the downstream portion of the device material; and determining an additional time period necessary to supply the additional amount of fuel, in excess of the stoichiometric amount, when operating the engine with the rich air-fuel mixture, wherein the first time period is further determined on the basis of the additional time period.

18. The method of claim 17, wherein the first time period includes a second time period after the detected concentration falls below a reference value, the second time period being no greater than the determined additional time period.

19. The method of claim 18, wherein calculating includes determining an amount of fuel that has been introduced into the exhaust purification system upstream of the device when the detected concentration falls below a reference value.

20. The method of claim 16, wherein detecting includes generating an output signal with an oxygen sensor located at the first position in the device.

21. The method of claim 16, wherein the upstream portion of the device is formed of a first $NO_x$-storing material and the downstream portion of the device is formed of a second $NO_x$-storing material.

* * * * *